2,764,564

RESINOUS REACTION PRODUCTS OF PHOSPHORUS THIOCHLORIDE AND INSOLUBLE CROSS-LINKED VINYL AROMATIC COPOLYMERS

Elmer L. McMaster and William K. Glesner, Midland, Mich., assignors to The Dow Chemical Company, Midland, Mich., a corporation of Delaware No Drawing. Application November 2, 1954,
Serial No. 466,442

7 Claims. (Cl. 260—2.2)

This invention concerns the acidic and salt forms of certain new cation exchange resins. It relates more particularly to insoluble cross-linked copolymers of monovinyl aromatic compounds and divinyl aromatic compounds, which copolymers contain on the aromatic nuclei substituent thiophosphonate groups. The invention also concerns a method of making the cation exchange resins.

The new cation exchange resins are prepared by reacting phosphorus thiochloride ($PSCl_3$) with an insoluble cross-linked copolymer of one or more monovinyl aromatic compounds and a divinyl aromatic compound to obtain a corresponding copolymer containing thiophosphonyl dichloride groups on the aromatic nuclei and hydrolyzing the latter groups, whereby thiophosphonate groups are formed. Thus, the cation exchange resins are insoluble, cross-linked vinyl aromatic copolymers containing on the aromatic nuclei substituent thiophosphonic acid groups, or corresponding thiophosphonate salt groups. The term "thiophosphonate group" employed herein pertains to the group —$PS(OH)_2$ and salts thereof, e. g. the sodium, potassium, calcium, magnesium, or ammonium thiophosphonate salt groups.

The new cation exchange resins are insoluble in water and aqueous 10 weight per cent solutions of acids or alkalies, e. g. aqueous solutions of sodium hydroxide, potassium hydroxide, hydrochloric acid, or sulfuric acid. They are insoluble in organic liquids such as methyl alcohol, ethyl alcohol, butyl alcohol, acetone, carbon tetrachloride, ethylene dichloride, benzene, toluene, chlorobenzene, or hexane. The resins are suitable for repeated use in sorbing cations from fluids and regeneration in usual ion exchange process. When employed in the treatment of basic fluids, e. g. an aqueous solution containing an alkali such as sodium hydroxide, the hydrogen form of the resin absorbs the sodium ions present in the solution with the result that the alkali is removed from the fluid and the resin is converted to a salt.

The copolymer starting material can be an insoluble cross-linked copolymer of from 80 to 99.5 per cent by weight of one or more monovinyl aromatic hydrocarbons of the benzene series, cross-linked with from 20 to 0.5 per cent by weight of a divinyl aromatic hydrocarbon. The monovinyl aromatic hydrocarbon may contain in addition to the vinyl radical a total of from 1 to 2 lower alkyl radicals each containing from 1 to 3 carbon atoms as nuclear substituents. Examples of suitable monovinyl aromatic compounds are styrene, vinyltoluene, vinylxylene, ethylvinylbenzene, or isopropylvinylbenzene. Examples of suitable divinyl aromatic hydrocarbons are divinylbenzene, divinyltoluene, divinylxylene or divinylethylbenzene. Typical examples of suitable copolymers are copolymers of styrene and divinylbenzene, styrene ethylvinylbenzene and divinylbenzene, or vinyltoluene, ethylvinylbenzene and divinylbenzene. Copolymers of at least 80 per cent by weight of styrene, a lesser amount of ethylvinylbenzene and from 0.5 to 10 per cent of divinylbenzene, are preferred.

The copolymers can be prepared by any of a variety of well-known methods employed for the polymerization of styrene. The monomers may be mixed and then polymerized in bulk, i. e. in the substantial absence of an inert liquid medium, or they may be emulsified or otherwise suspended in a liquid medium and polymerized. Suspension polymerization in which the monomers are suspended or dispersed in an inert non-solvent liquid medium such as water, or brine, and are then heated, agitated and copolymerized are preferred since such methods yield hard copolymers in the form of small spheroids, beads, or rounded granules, and the size of the particles can be regulated and controlled.

The polymerization of the vinyl aromatic compounds is accelerated by the addition of catalysts which provide oxygen, such as lauroyl peroxide, benzoyl peroxide, di-tertiary-butyl peroxide, di-tertiary-butyl diperphthalate, cumene hydroperoxide, etc. The catalysts are usually employed in amount corresponding to from 0.1 to 2 per cent by weight of the monomeric material to be polymerized.

The compositions are prepared by reacting the insoluble cross-linked copolymer in granular form with phosphorus thiochloride at temperatures between 25° and 125° C., preferably from 80° to 125° C. in the presence of a Friedel-Crafts catalyst such as aluminum chloride, ferric chloride, stannic chloride, or zinc chloride. The reaction is carried out while the copolymer is wet with, or swollen by, preferably while the copolymer is suspended in the liquid, phosphorus thiochloride. The reaction is usually carried out at atmospheric or substantially atmospheric pressure. The reaction is continued until the copolymer contains an average of at least one, preferably from four to ten, substituent thionophosphonyl dichloride groups for every ten aromatic nuclei in the copolymer.

The thiophosphorated copolymer is separated from the unreacted, or excess, phosphorus thiochloride and catalyst by filtering, and is washed with water, or with an organic liquid, e. g. diethyl ether, followed by washing with water. The copolymer containing thionophosphonyl dichloride groups, —$PSCl_2$, is hydrolyzed by heating the same with water, or a dilute aqueous solution of an acid, or an alkali, to convert the thionophosphonyl dichloride groups to the correspondings thiophosphonic acid groups, —$PS(OH)_2$, or a salt thereof. The hydrolysis, which occurs readily, is usually carried out at temperatures between 40° and 100° C. and at atmospheric pressure or thereabout. Thereafter, the resin is separated from the hydrolysis liquor and is washed with water. The copolymer containing substituent thiophosphonic acid groups can be treated with an aqueous solution of a base or a salt, e. g. sodium chloride, potassium hydroxide, calcium chloride, or magnesium sulfate, and washed with water to obtain the phosphorated copolymer, i. e. the cation exchange resin, in the corresponding salt form.

The following example illustrates a way in which the principle of the invention has been applied, but is not to be construed as limiting its scope.

*Example*

A charge of 9.5 grams (15 cc.) of a copolymer of 90 per cent by weight of styrene, 4 per cent of ethylvinylbenzene and 6 per cent of divinylbenzene in the form of rounded granules of sizes between 20 and 50 mesh per inch as determined by U. S. Standard screens, was placed in a glass reaction vessel equipped with a reflux condenser and stirrer. A charge of 6.2 grams of anhydrous aluminum chloride was added. Thereafter, 25 cc. of phosphorus thiochloride ($PSCl_3$) was added slowly with stirring at temperatures between 29° and 34° C. The resulting mixture was stirred and heated at temperatures between 70° and 75° C. for a period of 45 minutes, then cooled. The mixture was diluted with 50 cc. of chloroform, washed from the reaction vessel and filtered. The treated copolymer was washed with diethyl ether, then placed in a glass vessel, together with 200 cc. of water. The mixture was heated to boiling under reflux for a period of 18 hours. Thereafter, the resin was separated by filtering and was washed with water. It was titrated for cation exchange capacity. The procedure for determining the ion exchange capacity was to place the resin in 100 cc. of distilled water, add about 5 grams of sodium chloride and 25 cc. of an aqueous 1-normal sodium hydroxide solution, stir the mixture for 2 hours at room temperature, then titrate the solution with a 1-normal aqueous solution of hydrochloric acid to a pH value of 7 employing a Beckman glass electrode. The ion exchange capacity is calculated from the milliequivalents of HCl required per cubic centimeter of the wet resin in the hydrogen form to bring the solution to a pH value of 7. The resin had a cation exchange capacity corresponding to 10,000 grains of calcium carbonate per cubic foot of a bed of the resin. A portion of the resin in the hydrogen form was dried and analyzed. The dry resin was found to contain 6.92 per cent of phosphorus, 4.63 per cent of sulfur and 0.68 per cent of chlorine. This corresponds to about 0.45 thiophosphonic acid group per aromatic nucleus in the copolymer.

We claim:

1. An insoluble resinous thiophosphorated composition suitable for the removal of cations from fluids which comprises an insoluble cross-linked copolymer of a mixture of from 80 to 99.5 per cent by weight of at least one monovinyl aromatic hydrocarbon of the benzene series and from 20 to 0.5 per cent of a divinyl aromatic hydrocarbon, the said copolymer containing as substituents on the aromatic nuclei thereof, at least one thiophosphonate group per 10 aromatic nuclei.

2. An acidic form of an insoluble resinous thiophosphorated composition as claimed in claim 1, wherein at least part of the thiophosphonate groups are thiophosphonic acid radicals.

3. An insoluble resinous thiophosphorated composition as claimed in claim 1, wherein said copolymer contains as substituents on aromatic nuclei thereof, from 4 to 10 thiophosphonate groups per 10 aromatic nuclei.

4. An insoluble resinous thiophosphorated composition as claimed in claim 3, which comprises an insoluble cross-linked copolymer of at least 80 per cent by weight of styrene, a lesser amount of ethylvinylbenzene, and from 0.5 to 10 per cent of divinylbenzene, having thiophosphonate groups as substituents on aromatic nuclei of the copolymer molecule.

5. An insoluble resinous thiophosphorated composition as claimed in claim 3, which comprises an insoluble cross-linked copolymer of from 80 to 99.5 per cent by weight of and from styrene 20 to 0.5 per cent of divinylbenzene, having thiophosphonate groups as substituents on aromatic nuclei of the copolymer molecule.

6. A method of making an insoluble resinous thiophosphorated composition suitable for the removal of cations from fluids, which method comprises reacting phosphorus thiochloride with an insoluble cross-linked copolymer of from 80 to 99.5 per cent by weight of at least one monovinyl aromatic hydrocarbon of the benzene series and from 20 to 0.5 per cent of a divinyl aromatic hydrocarbon, by heating particles of the copolymer in admixture with phosphorus thiochloride and a Friedel-Crafts catalyst at reaction temperatures between 25° and 125° C., whereby a polymeric composition containing as substituents an aromatic nuclei thereof, at least one thionophosphonyl dichloride group per ten aromatic nuclei, is formed, and hydrolyzing the thionophosphonyl group, whereby the corresponding thiophosphonate group is formed.

7. A method of making an insoluble resinous thiophosphorated composition suitable for the removal of cations from fluids, which method comprises reacting phosphorus thiochloride with an insoluble cross-linked copolymer of at least 80 per cent by weight of styrene, a lesser amount of ethylvinylbenzene and from 0.5 to 10 per cent of divinylbenzene by heating particles of the copolymer in admixture with phosphorus thiochloride and a Friedel-Crafts catalyst at reaction temperatures between 25° and 125° C., whereby a polymeric composition containing as substituents on aromatic nuclei thereof, from 4 to 10 thionophosphonyl dichloride groups per 10 aromatic nuclei is formed and hydrolyzing the thionophosphonyl dichloride groups whereby the corresponding thiophosphonate groups are formed.

No references cited.